(12) United States Patent
Venkataraman et al.

(10) Patent No.: US 7,308,404 B2
(45) Date of Patent: *Dec. 11, 2007

(54) METHOD AND APPARATUS FOR SPEECH RECOGNITION USING A DYNAMIC VOCABULARY

(75) Inventors: Anand Venkataraman, Palo Alto, CA (US); Horacio E. Franco, Menlo Park, CA (US); Douglas A. Bercow, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 518 days.

This patent is subject to a terminal disclaimer.

(21) Appl. No.: 10/912,517

(22) Filed: Aug. 5, 2004

(65) Prior Publication Data

US 2005/0055210 A1 Mar. 10, 2005

Related U.S. Application Data

(63) Continuation-in-part of application No. 09/967,228, filed on Sep. 28, 2001, now Pat. No. 6,996,519.

(60) Provisional application No. 60/492,761, filed on Aug. 5, 2003.

(51) Int. Cl.
*G10L 15/18* (2006.01)
(52) U.S. Cl. ...................................... 704/255
(58) Field of Classification Search ................ 704/255
See application file for complete search history.

(56) References Cited

U.S. PATENT DOCUMENTS

| 5,177,685 | A | | 1/1993 | Davis et al. |
|---|---|---|---|---|
| 5,613,036 | A | * | 3/1997 | Strong ........................ 704/243 |
| 5,825,978 | A | | 10/1998 | Digalakis et al. |
| 5,839,106 | A | | 11/1998 | Bellegarda |
| 6,029,132 | A | | 2/2000 | Kuhn et al. |
| 6,314,165 | B1 | | 11/2001 | Junqua et al. |
| 6,526,380 | B1 | | 2/2003 | Thelen et al. |
| 6,631,346 | B1 | | 10/2003 | Karaorman et al. |
| 6,823,493 | B2 | | 11/2004 | Baker |
| 6,917,910 | B2 | * | 7/2005 | Itoh et al. ................... 704/200 |
| 7,027,987 | B1 | | 4/2006 | Franz et al. |

OTHER PUBLICATIONS

Hunt, M., "Automatic Identification of Spoken Names and Addresses - and why we should abolish account numbers," Novauris, A James Baker Company Presentation, www.novauris.com, Date Unknown, (Assignee became aware of this reference on Feb. 4, 2005).

Geutner, P., et al., "Transcribing Multilingual Broadcast News Using Hypothesis Driven Lexical Adaption", Interactive Systems Laboratories, School of Computer Science, Carnegie Mellon University, In Proc. DARPA Broadcast News Workshop, http://www.nist.gov/speech/publications/darpe98/html/bn60.htm, 1998.

* cited by examiner

*Primary Examiner*—Susan McFadden
(74) *Attorney, Agent, or Firm*—Kin-Wah Tong, Esq.; Patterson & Sheridan, LLP

(57) ABSTRACT

A method and apparatus are provided for performing speech recognition using a dynamic vocabulary. Results from a preliminary speech recognition pass can be used to update or refine a language model in order to improve the accuracy of search results and to simplify subsequent recognition passes. This iterative process greatly reduces the number of alternative hypotheses produced during each speech recognition pass, as well as the time required to process subsequent passes, making the speech recognition process faster, more efficient and more accurate. The iterative process is characterized by the use of results from one or more data set queries, where the keys used to query the data set, as well as the queries themselves, are constructed in a manner that produces more effective language models for use in subsequent attempts at decoding a given speech signal.

49 Claims, 5 Drawing Sheets ic application Ser. No. 09/967,228, filed Sep. 28, 2001 now
METHOD AND APPARATUS FOR SPEECH RECOGNITION USING A DYNAMIC VOCABULARY

CROSS REFERENCE TO RELATED APPLICATIONS

This application is a continuation-in-part of U.S. patent application Ser. No. 09/967,228, filed Sep. 28, 2001 now U.S. Pat. No. 6,996,519 (titled "Method and Apparatus for Performing Relational Speech Recognition"), which is herein incorporated by reference in its entirety. In addition, this application claims the benefit of U.S. Provisional Patent Application Ser. No. 60/492,761, filed Aug. 5, 2003 (titled "Method for Refinement of Speech Recognition Hypothesis"), which is herein incorporated by reference in its entirety.

FIELD OF THE INVENTION

The present invention relates generally to speech recognition and relates more specifically to speech recognition systems having dynamic vocabularies.

BACKGROUND OF THE DISCLOSURE

Conventional speech recognition systems used for accessing structured data tend to be very restrictive in terms of the signals (e.g., user commands or utterances) that may be input to search a database. That is, if a user issues a verbal request that is not phrased to exactly match a data item in the system's database, the system may produce inaccurate or incomplete results.

One proposed solution to this problem is to include a plurality of potential alternate signals that may be spoken for each item in the database; however, memory constraints make this proposal difficult to feasibly implement.

Thus, there is a need in the art for a method and apparatus for speech recognition using a dynamic vocabulary.

SUMMARY OF THE INVENTION

In one embodiment, the present invention relates to a method and apparatus for performing speech recognition using a dynamic vocabulary. Results from a preliminary speech recognition pass can be used to update or refine a language model in order to improve the accuracy of search results and to simplify subsequent recognition passes. This iterative process greatly reduces the number of alternative hypotheses produced during each speech recognition pass, as well as the time required to process subsequent passes, making the speech recognition process faster, more efficient and more accurate. The iterative process is characterized by the use of results from one or more data set queries, where the keys used to query the data set, as well as the queries themselves, are constructed in a manner that produces more effective language models for use in subsequent attempts at decoding a given speech signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
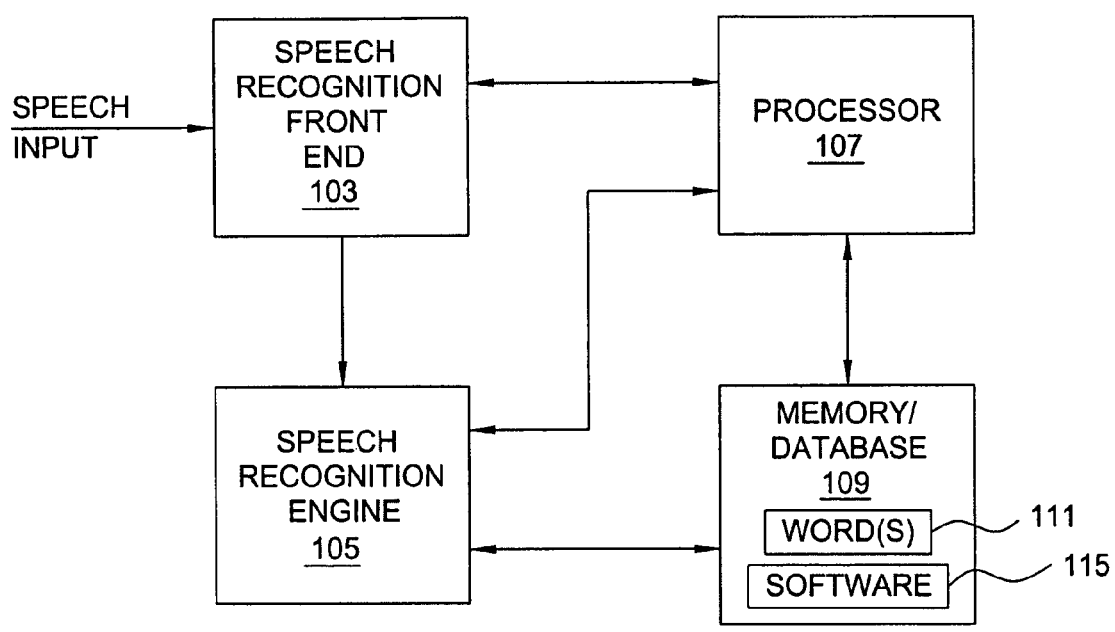
FIG. 1 is a block diagram of a speech recognition system that operates in accordance with the present invention.

The present invention relates to a method and apparatus for speech recognition using a dynamic vocabulary. FIG. 1 is a block diagram illustrating a speech recognition system 101 that operates in accordance with the present invention. This system 101 may be implemented in a portable device such as a hand held computer, a portable phone, or an automobile. It may also be implemented in a stationary device such as a desktop personal computer or an appliance, or it may be distributed between both local and remote devices. The speech recognition system 101 illustratively comprises a speech recognition front end 103, a speech recognition engine 105, a processor 107, and a memory/database 109. In further embodiments, the speech recognition system 101 may also comprise one or more input/output (I/O) devices (not shown) such as a display, a keyboard, a mouse, a modem and the like. In one embodiment, at least one I/O device is a storage device (e.g., a disk drive, an optical disk drive or a floppy drive).

The speech recognition front end 103 receives and samples spoken input, and then measures and extracts features or characteristics of the spoken input that are used later in the speech recognition process. The speech recognition engine 105 may include a search method (such as a Viterbi search method) and acoustic models (such as models of individual phonemes or models of groups of phonemes) used in the speech recognition process. The processor 107 and associated memory 109 together operate as a computer to control the operation of the front end 103 and the speech recognition engine 105. The memory 109 stores recognizable words and word sets 111 in an accessible database that is used by the system 101 to process speech. Memory 109 also stores the software 115 that is used to implement the methods of the present invention. Both the speech recognition front end 103 and the speech recognition engine 105 may be implemented in hardware, software, or combination of hardware and software (e.g., using Application Specific Integrated Circuits (ASIC)), where the software is loaded from a storage medium (e.g., an I/O device) and operated by the processor 107 in the memory 109 of the system 101. As such, in one embodiment, the speech recognition front end 103 and/or the speech recognition engine 105 can be stored on a computer readable medium or carrier (e.g., RAM, magnetic or optical drive or diskette, and the like).

In one embodiment, the invention relates to speech recognition systems and methods used to recognize words that have observable relationships. Examples of word sets with observable relationships are addresses; locations; names and telephone numbers; airline flight numbers, departure/arrival times, and departure/arrival cities; product part numbers, catalog numbers, and product names; and any other sets of words used to identify a person, place, thing or action.

Groups of words with observable relationships may be referred to as "sparse domains" or domains that have a small "Cartesian product" because typically only a small fraction of all possible word combinations are valid combinations. For example, an address with the ZIP code "94025" is only associated with the city of Menlo Park, Calif. "San Francisco, Calif. 94025" or "Menlo Park, N.J. 94025" are not valid addresses.

Figure 2:
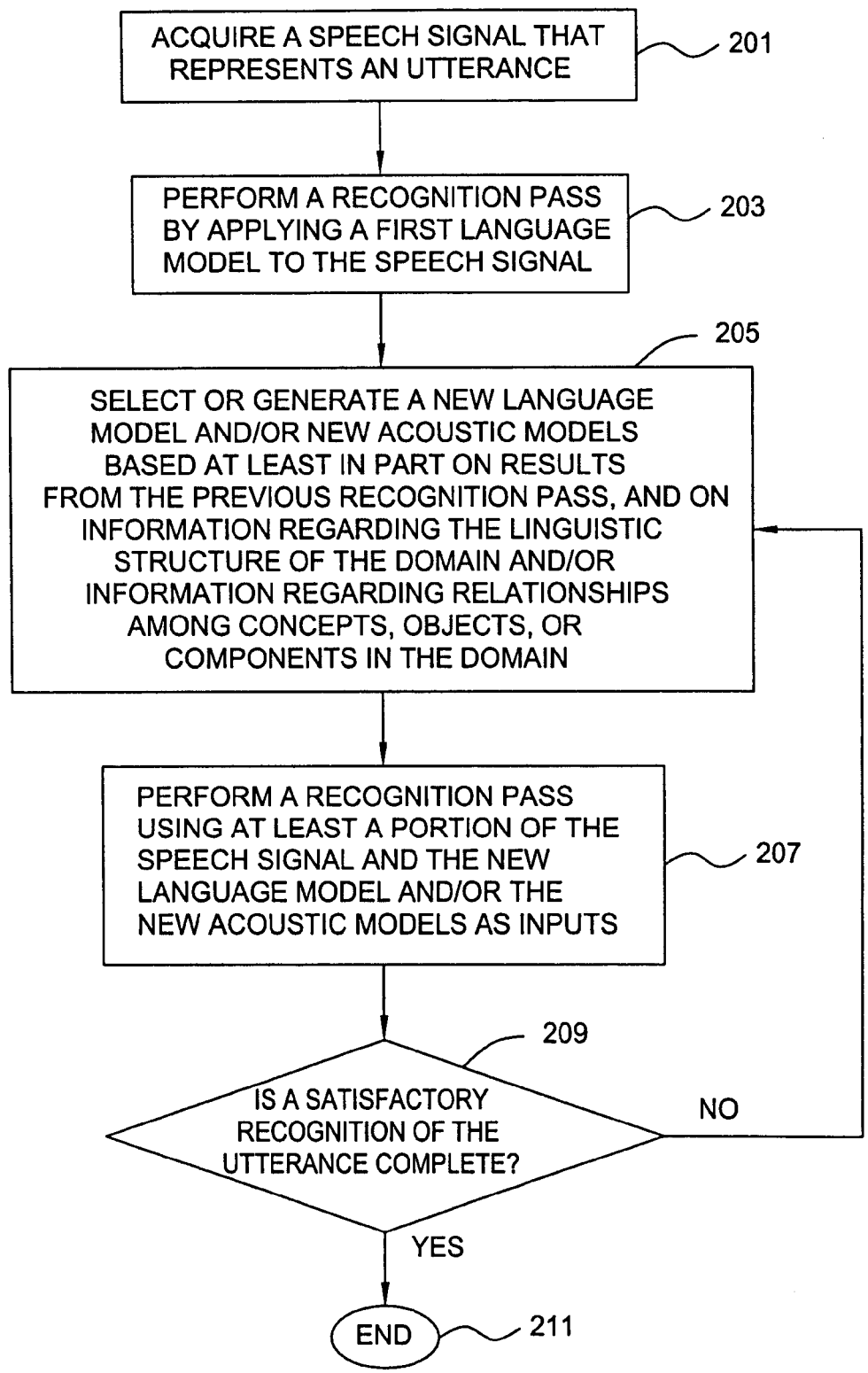
FIG. 2 is a flow chart illustrating a method for recognizing words that have observable relationships.

FIG. 2 is a flow chart illustrating a preferred method for recognizing words that have observable relationships. This method may be implemented as a software routine 115 that is executed by the processor 107 of FIG. 1. When a speech signal that represents a spoken utterance is received (step 201), a speech recognition "pass" is performed by applying a first language model to the speech signal (step 203). The language model may be a probabilistic finite state grammar, a statistical language model, or any other language model that is useful in a speech recognition system. The first recognition pass does not attempt to recognize the entire speech signal; for example, if the utterance represents an address, the first recognition pass may use a language model that recognizes only city names or only street numbers.

Next, a new language model and/or new acoustic models are selected or generated (step 205). The selection or generation of the new model or models is based at least in part on results from the previous recognition pass, and may also be based on information regarding the linguistic structure of the domain and/or information regarding relationships among concepts, objects, or components in the domain. For example, the previous recognition passes may have recognized the city name "Menlo Park" and the street number "333." Based on this information, a new language model might be generated or selected that includes only those streets in Menlo Park that have "333" as a street number.

This new language model and/or acoustic models and at least a portion of the speech signal are then used to perform another recognition pass (step 207). If a satisfactory recognition of the spoken utterance is complete (step 209), the speech recognition process ends (step 211). If a satisfactory recognition of the spoken utterance is not complete, then steps 205-209 are repeated as necessary.

Figure 3:
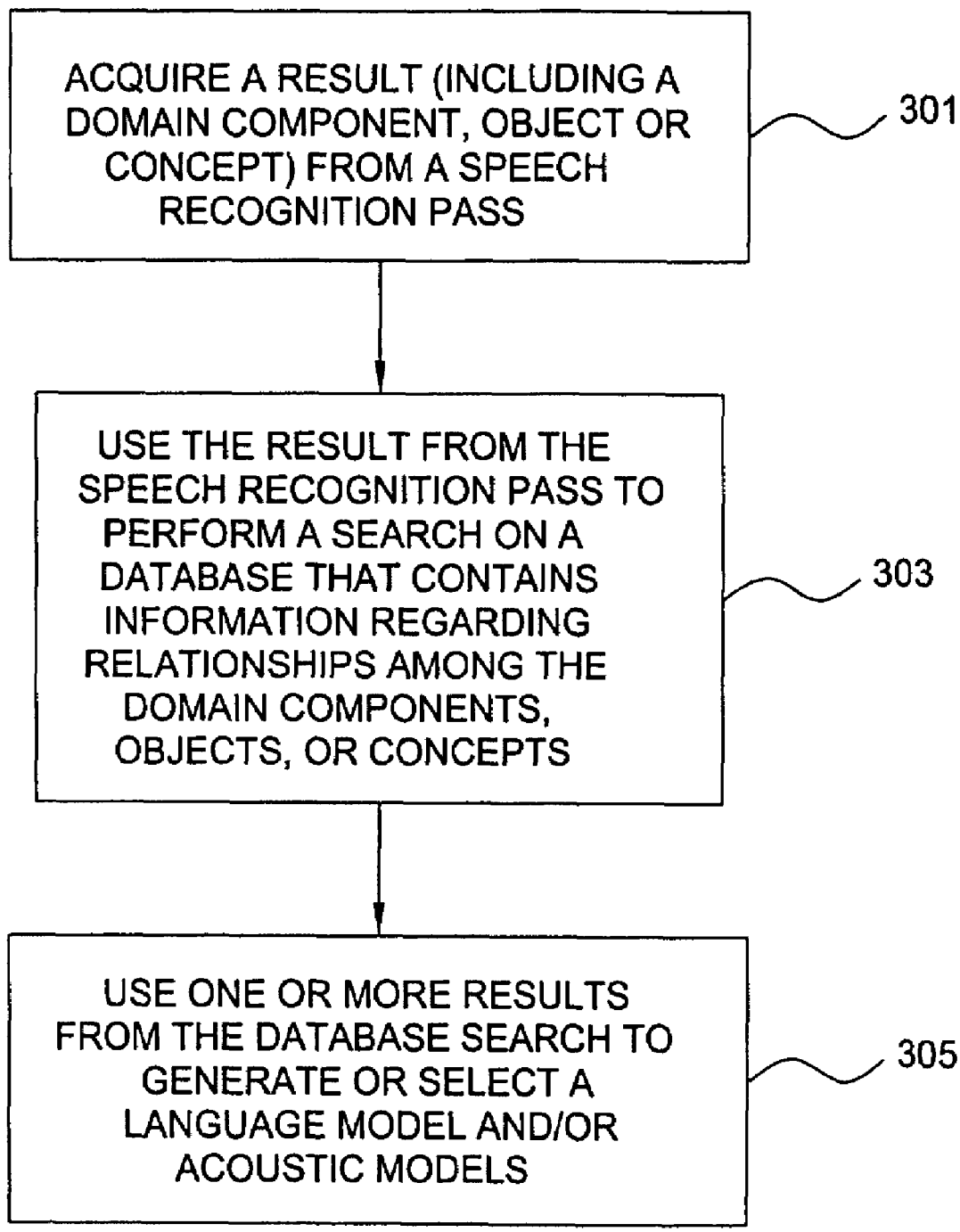
FIG. 3 is a flow chart illustrating a method for generating or selecting new language models and/or new acoustic models for use in a speech recognition process.

FIG. 3 is a flowchart that illustrates a preferred method for generating or selecting a new language model and/or new acoustic models (i.e., a method performing step 205 of FIG. 2.). In this method, a result from a speech recognition pass is acquired (step 301). This result includes a component, object or concept of the relevant domain. For example, if the speech recognition system is being used to recognize an address, the result from the previous recognition pass may include a street number or city name.

Next, the result from the speech recognition pass is used to perform a search on a database that contains information regarding relationships among the domain concepts, objects, or components (step 303). For example, the database may be a relational database that has information regarding the relationships among the components of an address. A search on the city name "Menlo Park" might find all the street names in that city; a search on the ZIP code "94025" might find all the streets within that ZIP code; and so on.

Finally, one or more results from the database search are then used to select or generate a language model and/or acoustic models (step 305). For example, the results from a database search on the ZIP code "94025" might be used to generate a language model (or select an existing language model) that includes all of the street names in that ZIP code. Or, the results from a database search on the city name "Menlo Park" and the street name "Ravenswood Avenue" might be used to generate or select a language model that includes all of the street numbers on Ravenswood Avenue in Menlo Park. Language models generated or selected this way can be used to greatly reduce the search space of subsequent recognition passes, making the speech recognition process both faster and more accurate.

Figure 4:
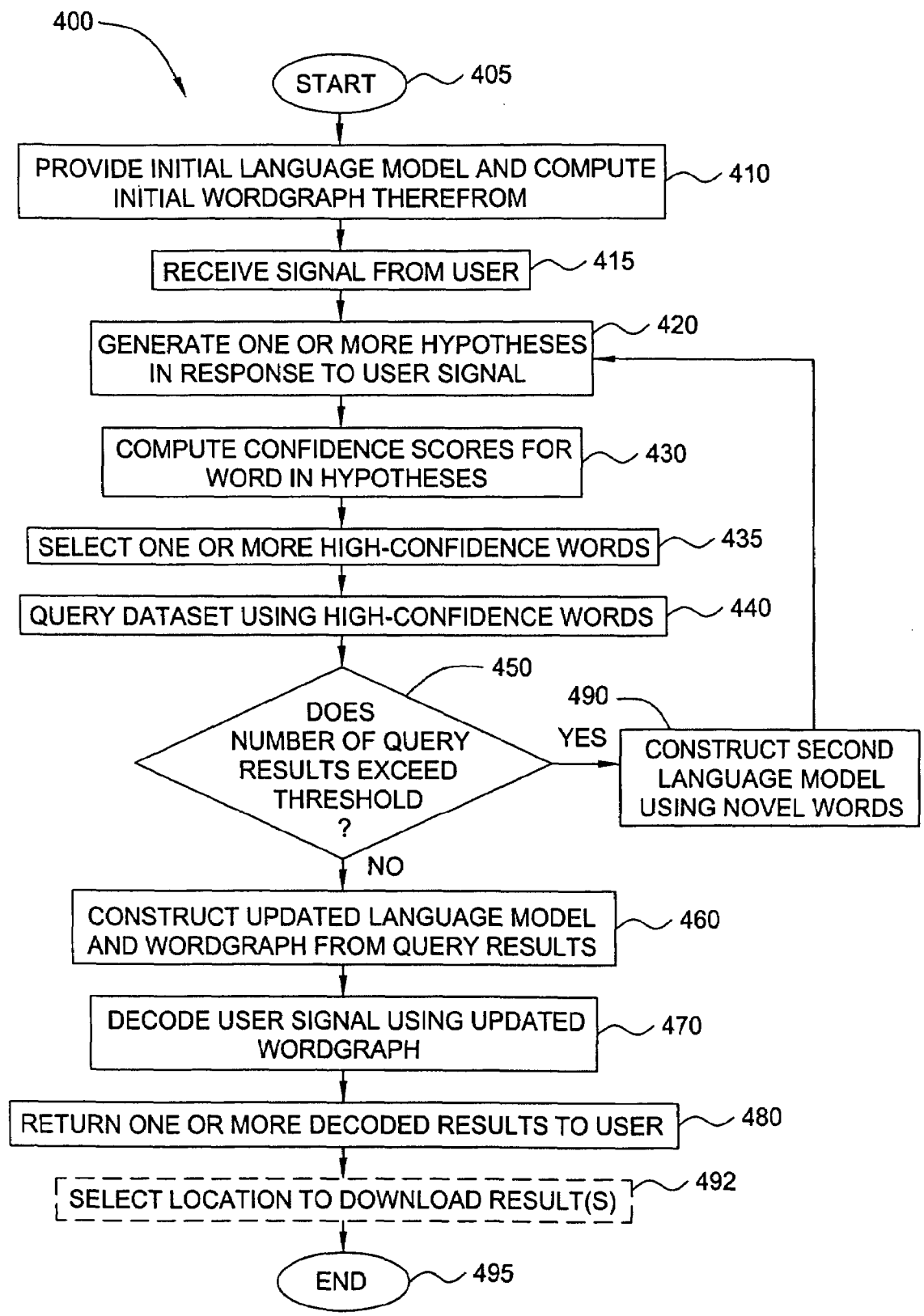
FIG. 4 illustrates a flow diagram that depicts one embodiment of a method for speech recognition using a dynamic vocabulary, according to the present invention.

FIG. 4 illustrates a flow diagram that depicts one embodiment of a method 400 for speech recognition using a dynamic vocabulary, according to the present invention. In one embodiment, this method is implemented as a software routine 115 that is executed by the processor 107 of FIG. 1. The method 400 is initialized at step 405 and proceeds to step 410, where the method 400 provides an initial language model, from which an initial wordgraph is computed. The initial wordgraph is a network of words and utterances that a user signal (e.g., a spoken request) could possibly include. In one embodiment, the initial language model is constructed so as to bias recognition hypotheses in favor of a domain under consideration. For example, if the method of the present invention is deployed in a music-related application, the initial language model provided in step 410 might be tailored to a domain comprising song titles. In one embodiment, other possible domains for which an initial language model could be tailored include movies, books, games, cellular phone ring tones, auction items, library and retail catalogs, directory listings and addresses, among others.

In one embodiment, the initial language model is constructed using maximum-likelihood interpolation of an open language model (e.g., a language model that does not restrict a search space to a particular domain or sub-domain) with a domain-specific language model. In an alternate embodiment, a class-based language model may be used to enable the method 400 to achieve varying degrees of generalization within a given domain. In another embodiment, a mismatched language model is provided (e.g., wherein phrases from which the model was built are typically not those that would be uttered by a user). For example, a language model built from a broadcast news report might be deployed in a system configured to recognize song titles.

In step 415, the method 400 receives a signal (e.g., a spoken request for data) from a user. For example, a user may dial a music server on his cellular phone and say, "I'd like to listen to 'Radio Gaga' by Queen." In step 420, the method 400 generates one or more hypotheses (e.g., proposed data matches) in response to the user signal by decoding the signal using the initial wordgraph computed in step 410.

In step 430, the method 400 computes a confidence score for each of the words appearing in each of the hypotheses produced in step 420. The confidence score represents a likelihood that a data set query using the corresponding scored word will identify one or more data items corresponding to the user signal. In one embodiment, confidence scores are computed by combining the hypotheses produced in step 420 into a second wordgraph and computing posterior probability scores for each word at each temporal position in the second wordgraph. In step 435, one or more high-confidence words are selected for use in a data set query. In one embodiment, high-confidence words are identified as any words having a confidence score that at least meets a predefined threshold. In one embodiment, where confidence scores are computed using a second wordgraph as described above, words having confidence scores that fall below a first predefined threshold are eliminated from the wordgraph, and the remaining words are identified as a set of high-confidence words suitable for selection. For instance, in the example provided above, the method 400 may return the words "Radio" and "Queen" as high-confidence words, since "Gaga" is a typically unknown word and since the user's cellular phone may capture background noise in addition to the user's spoken request.

In step 440, the method 400 uses the one or more high-confidence words selected in step 430 query a data set. In one embodiment, the data set represents metadata related to resources, for which the user signal represents a request for access. In one embodiment, the data set is a database or the World Wide Web. For example, if the method 400 were deployed in a music-related application, the metadata might include song titles and/or artist names. Thus, if the method 400 used the words "Radio" and "Queen" to query a music-related data set for all songs that contain both words in their song track information, a set of returned results would likely include "Queen Greatest Hits Two: 'Radio Gaga' by Freddie Mercury."

In step 450, the method 400 determines whether a number of results produced by the query of step 440 exceeds a second predefined threshold. If the method 400 determines that the number of query results does exceed the second predefined threshold, the method 400 proceeds to step 490 and constructs a second language model. In one embodiment, the second language model is constructed by updating the initial language model based on the query results. In another embodiment, the second language model is constructed as a new language model.

Figure 5:
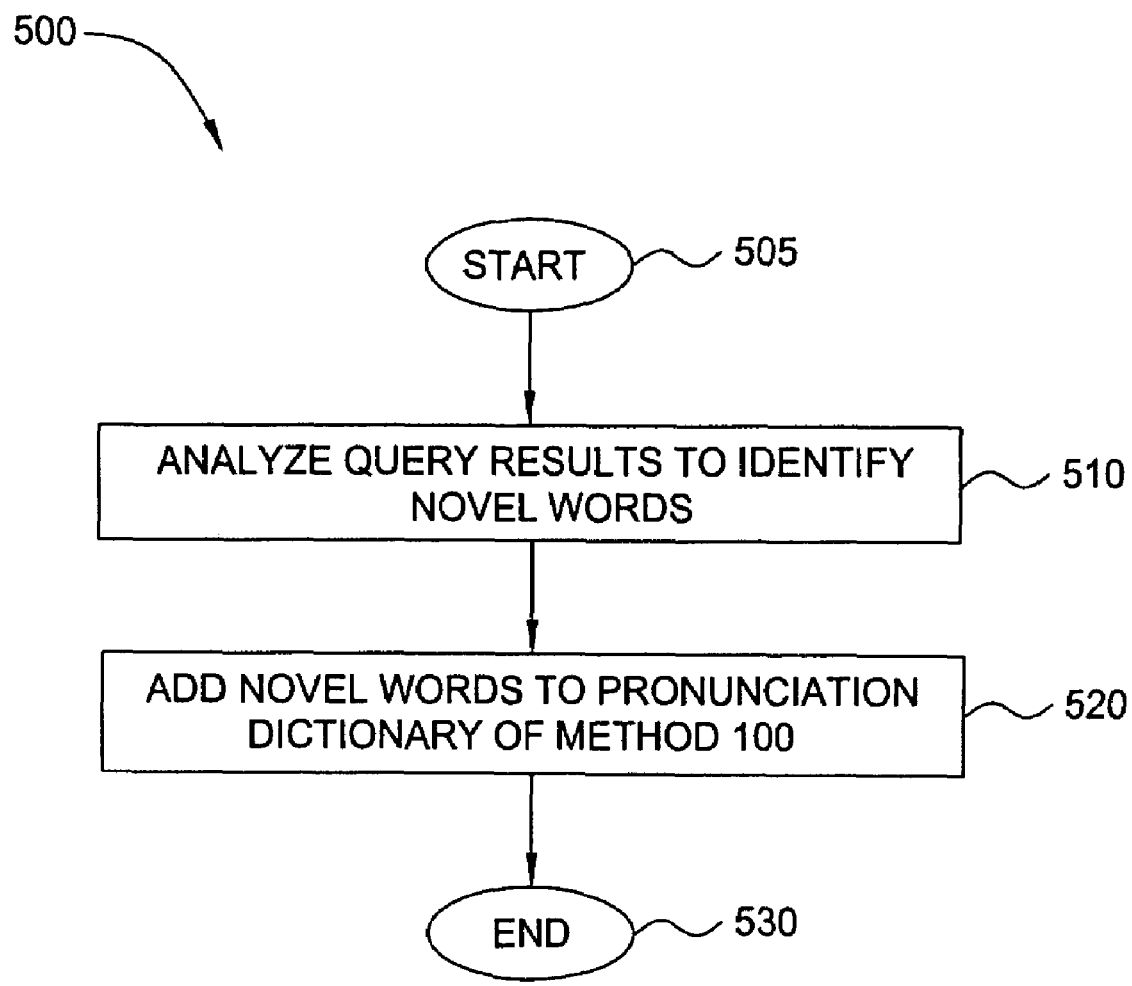
FIG. 5 is a flow diagram illustrating one embodiment of a method for constructing a second language model in accordance the method illustrated in FIG. 4.

FIG. 5 is a flow diagram illustrating one embodiment of a method 500 for constructing the second language model (or updating the initial language model, as the case may be) in accordance with step 490 of the method 400. The method 500 is initialized at step 505 and proceeds to step 510, where the method 500 analyzes the query results to find novel words (e.g., words contained in the query results that are not present in the current incarnation of the initial language model). For instance, using the example provided above, the method 400 may determine in step 490, based on the results returned in step 440, that "Gaga" is a "novel" word contained in the user's signal (but not contained in the initial language model). The method 500 then proceeds to step 520 and adds the novel words (e.g., "Gaga") to the method 400's pronunciation dictionary, thereby enabling the novel words to be identified the next time they are spoken by the user. In one embodiment, pronunciation of novel words is derived from their spelling in accordance with the methods described in M. J. Dedina and H. C. Nusbaum, "PRONOUNCE: A Program for Pronunciation by Analogy", Computer Speech and Language 5, p. 55-64, 1991, although other methods for deriving pronunciations may be employed without departing from the scope of the present invention. The method 500 terminates in step 530.

The second language model and any subsequent language models are constructed in a manner that successively narrows the space (e.g., the portion of the data set) that is queried. For instance, in the example provided above, the second language model might allow only for the possibility that the user signal contains a request for a song by Queen with the word "radio" in its title. However, the second language model may also allow for several alternative ways of requesting each such song. For example, the second language model may rely in part on knowledge of how natural language queries are made, including ways in which such queries could actually be phrased by a user. These include the use of prefixes (e.g., "Play me X."; "Get me X."; "Please find me X."; "I'd like to listen to X."; "Do you have X?"; etc.), infixes (e.g., "X sung by Y."; "X performed by Y."; "X by Y."; "X from the album Z."; etc.), suffixes (e.g., "Please"; "Thank you"; "If you have it"; etc.) and disfluencies (e.g., "Uh"; "Hmm"; etc.).

In one embodiment, the second or updated language model is implemented directly as a search graph that efficiently encodes parallel paths from the start of the search graph to the end of the search graph. Each parallel path represents one possible way in which a user could phrase a request for one of the results returned by the data set query.

In another embodiment, the second language model is a statistical n-gram language model constructed in accordance with known techniques, such as those described in A. Stolcke, "SRILM: An Extensible Language Modeling Toolkit," Proc. Intl. Conf. on Spoken Language Processing, Vol. 2, pp. 901-904 (2002).

Referring back to FIG. 4, once the current language model has been implemented (e.g., through construction of a second language model or update of the initial language model) as necessary in step 490, the method 400 returns to step 420 and generates one or more new hypotheses by decoding the user signal (received in step 415) using an updated wordgraph computed from the second language model produced in step 490. Thus, if a first data set query produces a list of words or phrases ranked by confidence scoring, and a second data set query using these listed words fails to produce many query results, the data set may be iteratively queried using progressively fewer words (e.g., by eliminating the lowest-confidence word with each query), and a subsequent language model can be constructed based on the union of the results obtained from all of the iterative queries.

Alternatively, if the method 400 determines that the number of query results does not exceed the second predefined threshold, the method 400 proceeds to step 460 and constructs an updated language model and wordgraph from the query results. The method 400 thereby refines decoding of the user signal to specifically target the query results obtained in step 440. In one embodiment, the pronunciation of any new words (e.g., words not contained in the initial language model) is derived in accordance with Dedina et al. as described above.

Alternatively, if the second predefined threshold is not exceeded, the method 400 may attempt to increase the number of query results returned in order to increase the likelihood of finding a result that corresponds to the user signal. For example, the method 400 may query the data set for a second time, lowering the first pre-defined threshold so that a less restrictive set of high-confidence words is used in the second query.

In another embodiment, multiple alternative sets of high-confidence words may be used in multiple queries of the data set. For example, heuristic techniques may be implemented to expand the set of queries made to the data set. These techniques may be employed when it is expected that the information retrieved from a first data set query will be insufficient to generate a rich enough set of results to guarantee the presence of the item requested by the user in a subsequent language model. For example, where the user signal comprises a request for an address, a set of hypotheses (e.g., generated in accordance with step 420) may include "33", "333" and "338" as potential street numbers (ranked by confidence scoring in that order) and "94025" and "94035" as potential zip codes (also ranked by confidence scoring in that order). If a combination of street number "33" and zip code "94025" fails to produce any results in a data set query, or if results are produced by a first data set query that suffer from contingent inaccuracies, heuristic techniques may be implemented to expand the query step (step 440) so that several queries in accordance with step 440 are performed. Each query is based on a different cross product of hypotheses (e.g., different combinations of street numbers and zip codes) from an N-best list of hypotheses based on the first data set query. A second data set query is constructed from the union of results of these several queries, e.g., (33, 94025), (33, 94035), (333, 94025), (333, 94035), (338, 94025) and (338, 94035).

In step 470, the method 400 decodes the user signal using the updated wordgraph constructed in step 460. In one embodiment, decoding is accomplished by assigning probabilities to each phrase in the wordgraph, where a probability represents the likelihood that the phrase matches the user signal (e.g., is the phrase uttered by the user).

In step 480, the method 400 returns one or more results of the decoding performed in step 470. In one embodiment, the method 400 returns the phrase with the highest assigned probability. In another embodiment, the method 400 returns a plurality of phrases (e.g., the phrases with the ten highest assigned probabilities, or all phrases having an assigned probability that deviates from the highest probability by less than a given amount). In yet another embodiment, if more than one result is produced in step 470, the method 400 may perform additional decoding iterations in which more words from the "correct" hypothesis are identified, thereby progressively narrowing the search space to a single phrase matching the user signal.

In one embodiment, the method 400 proceeds to step 492 and enables the user to select a location for the download or transmission of the results returned in step 480. For example, the user may use a cellular phone to initiate a request for data (e.g., a song), but may wish to have the requested data downloaded to a remote location, for example, a home computer. In one embodiment, other remote locations include a desktop computer, a laptop computer, a personal digital assistant (PDA), a wristwatch, a portable music player, a car stereo, a hi-fi/entertainment center, a television, a digital video recorder (DVR), or a cable or satellite set stop box, among others. Once the method 400 has returned one or more results to the user as defined by the method 400's operating parameters, the method 400 terminates in step 495.

In one embodiment, the method 400 may be executed in its entirety at a single computing device. However, persons skilled in the art will appreciate that various steps of the method 400 may be executed at two or more separate computing devices in order to enhance the speed, scalablity and/or availability of a system in which the method 400 is implemented. For instance, the method 400 may receive a signal from a user, in accordance with step 415, at a computing device that is local to the user. However, one or more of the steps subsequent to step 415 may be performed at one or more remote computing devices.

For example, decoding of the user signal (in accordance with step 420) may include, without limitation, a first, generic recognition pass and a second, more specialized recognition pass. The first and second recognition passes may be executed at a common server computer, or each recognition pass could be hosted at an individual server computer. Moreover, a plurality of server computers adapted for performing specialized recognition passes may be implemented to receive query results (e.g., obtained through step 440), so that a single server computer is not required to process all query results. This increases server availability, as well as the amount of information that may be stored at the server level, and reduces failure rate by providing alternatives in the event of failure of one or more servers.

Additionally, decoding step 420 may comprise both a local processing step and a remote processing step. For example, the local processing step may be executed at a local device (e.g., the device that directly receives the user signal) to process the user signal and extract features therefrom. Features extracted during the local processing step may then be transmitted over a network to a remote server for the remote processing step, which involves generating one or more hypotheses in response to the extracted features of the user signal. This approach reduces bandwidth use and demands on the remote server by transmitting only portions (e.g., extracted features) of the user signal for processing, rather than transmitting the entire user signal. Exemplary methods for performing step 420 in accordance with both local and remote processing steps are described in co-pending, commonly assigned U.S. patent application Ser. No. 10/033,772 (filed Dec. 28, 2001), which is herein incorporated by reference.

In further embodiments, database searches in accordance with step 440 may also be distributed over one or more remote computing devices. For example, once the method 400 selects one or more high-confidence words with which to query the relevant data set(s), the method 400 may transmit these high-confidence words over a network to one or more remotely stored databases. Database searches in accordance with step 440 may implement distributed and/or parallel search techniques, including those described in co-pending, commonly assigned U.S. patent application Ser. No. 10/242,285 (filed Sep. 12, 2002) and Ser. No. 10/399,807 (filed Apr. 23, 2003), both of which are herein incorporated by reference.

Thus, the present invention represents a significant advancement in the field of speech recognition. In one embodiment, the inventive method and apparatus are provided with a dynamic vocabulary that updates each time a word not present in an initial language model is spoken. The dynamic vocabulary enables the method and apparatus to progressively narrow a space in which results (e.g., matches) for a user signal are searched, thereby increasing the accuracy of results that are returned to the user.

Although various embodiments which incorporate the teachings of the present invention have been shown and described in detail herein, those skilled in the art can readily devise many other varied embodiments that still incorporate these teachings.

What is claimed is:

1. A method for decoding a spoken request for information, the method comprising the steps of:
   receiving said spoken request from a user;
   applying an initial language model to said spoken request to identify one or more words contained in said spoken request; and
   generating a second language model that includes words in said spoken request that are not recognized by said application of said initial language model.

2. The method of claim 1, wherein said second language model is generated by updating said initial language model.

3. The method of claim 1, wherein said initial language model is biased to generate results tailored to a specified domain.

4. The method of claim 3, wherein said specified domain is at least one of music, movies, books, games, cellular phone ring tones, auction items, addresses, directory listings, library catalogs and retail catalogs.

5. The method of claim 1, where said second language model is implemented as a recognizer search graph embodying a plurality of possible ways in which said spoken request could be phrased.

6. The method of claim 5, wherein said search graph is implemented by encoding a plurality of parallel paths from a start of said search graph to an end of said search graph, each path representing one possible way in which said spoken request could be phrased.

7. The method of claim 1, wherein the step of applying an initial language model comprises:
generating one or more hypotheses representative of data items potentially corresponding to said spoken request;
computing confidence scores for each word appearing in each of said hypotheses; and
selecting one or more high-confidence words having confidence scores that at least meet a first predefined threshold.

8. The method of claim 7, wherein the step of computing confidence scores comprises:
combining said hypotheses into a wordgraph and computing posterior probability scores for each word at each position in said hypotheses.

9. The method of claim 7, further comprising the step of:
querying a data set using said high-confidence words, where said data set contains data items potentially corresponding to said spoken request.

10. The method of claim 9, further comprising the step of:
determining if a number of query results produced by querying said data set exceeds a second predefined threshold.

11. The method of claim 10, further comprising the step of:
querying said data set for a second time with a less restrictive set of high-confidence words if the number of query results produced does not exceed said second predefined threshold.

12. The method of claim 10, further comprising the step of:
querying said data set for a second time with multiple alternative sets of high-confidence words if the number of query results produced does not exceed said second predefined threshold.

13. The method of claim 10, wherein the step of generating a second language model comprises:
analyzing said query results to identify novel words not contained within said initial language model, if said number of query results exceeds said second predefined threshold;
constructing a pronunciation dictionary for word recognition using said second language model; and
adding said novel words to said pronunciation dictionary.

14. The method of claim 10, wherein the step of generating a second language model comprises:
constructing said second language model based on said query results, if said number of query results does not exceed said second predefined threshold.

15. The method of claim 14, further comprising the step of:
applying said second language model to said spoken request to identify one or more additional words contained in said spoken request.

16. The method of claim 15, wherein said step of applying said second language model comprises:

assigning probabilities to each data item in said second language model, where said probabilities represent the likelihood that a data item corresponds to said spoken request; and
returning one or more data items to said user based upon said assigned probabilities.

17. The method of claim 16, wherein said step of returning one or more data items comprises:
returning a data item having a highest assigned probability.

18. The method of claim 16, wherein said step of returning one or more data items comprises:
returning a plurality of data items, where each of said plurality of data items has an assigned probability that deviates from a highest probability by less than a predefined degree.

19. The method of claim 16, further comprising the step of:
downloading said one or more data items to a remote location.

20. The method of claim 17, wherein said one or more data items are downloaded to at least one of a desktop computer, a laptop computer, a personal digital assistant, a wristwatch, a portable music player, a car stereo, a hi-fi/ entertainment center, a television, a digital video recorder, or a cable or satellite set stop box.

21. The method of claim 1, wherein the method is executed in its entirety at a single computing device.

22. The method of claim 1, wherein execution of two or more steps of the method is distributed among a plurality of processors.

23. A computer readable medium containing an executable program for decoding a spoken request for information, where the program performs the steps of:
receiving said spoken request from a user;
applying an initial language model to said spoken request to identify one or more more words contained in said spoken request; and
generating a second language model that includes words in said spoken request that are not recognized by said application of said initial language model.

24. The computer readable medium of claim 23, wherein said second language model is generated by updating said initial language model.

25. The computer readable medium of claim 23, wherein said initial language model is biased to generate results tailored to a specified domain.

26. The computer readable medium of claim 25, wherein said specified domain is at least one of music, movies, books, games, cellular phone ring tones, auction items, addresses, directory listings, library catalogs and retail catalogs.

27. The computer readable medium of claim 23, wherein said second language model is implemented as a recognizer search graph embodying a plurality of possible ways in which said spoken request could be phrased.

28. The computer readable medium of claim 27, wherein said search graph is implemented by encoding a plurality of parallel paths from a start of said search graph to an end of said search graph, each path representing one possible way in which said spoken request could be phrased.

29. The computer readable medium of claim 23, wherein the step of applying an initial language model comprises:
generating one or more hypotheses representative of data items potentially corresponding to said spoken request;
computing confidence scores for each word appearing in each of said hypotheses; and selecting one or more high-confidence words having confidence scores that at least meet a first predefined threshold.

30. The computer readable medium of claim 29, wherein the step of computing confidence scores comprises:
combining said hypotheses into a wordgraph and computing posterior probability scores for each word at each position in said hypotheses.

31. The computer readable medium of claim 29, further comprising the step of:
querying a data set using said high-confidence words, where said data set contains data items potentially corresponding to said spoken request.

32. The computer readable medium of claim 31, further comprising the step of:
determining if a number of query results produced by querying said data set exceeds a second predefined threshold.

33. The computer readable medium of claim 32, further comprising the step of:
querying said data set for a second time with a less restrictive set of high-confidence words if the number of query results produced does not exceed said second predefined threshold.

34. The computer readable medium of claim 32, further comprising the step of:
querying said data set for a second time with multiple alternative sets of high-confidence words if the number of query results produced does not exceed said second predefined threshold.

35. The computer readable medium of claim 32, wherein the step of generating a second language model comprises:
analyzing said query results to identify novel words not contained within said initial language model, if said number of query results exceeds said second predefined threshold;
constructing a pronunciation dictionary for word recognition using said second language model; and
adding said novel words to said pronunciation dictionary.

36. The computer readable medium of claim 32, wherein the step of generating a second language model comprises:
constructing said second language model based on said query results, if said number of query results does not exceed said second predefined threshold.

37. The computer readable medium of claim 36, further comprising the step of:
applying said second language model to said spoken request to identify one or more additional words contained in said spoken request.

38. The computer readable medium of claim 37, wherein said step of applying said second language model comprises:
assigning probabilities to each data item in said second language model, where said probabilities represent the likelihood that a data item corresponds to said spoken request; and
returning one or more data items to said user based upon said assigned probabilities.

39. The computer readable medium of claim 38, wherein said step of returning one or more data items comprises:
returning a data item having a highest assigned probability.

40. The computer readable medium of claim 38, wherein said step of returning one or more data items comprises:
returning a plurality of data items, where each of said plurality of data items has an assigned probability that deviates from a highest probability by less than a predefined degree.

41. The computer readable medium of claim 37, further comprising the step of:
downloading said one or more data items to a remote location.

42. The computer readable medium of claim 41, wherein said one or more data items are downloaded to at least one of a desktop computer, a laptop computer, a personal digital assistant, a wristwatch, a portable music player, a car stereo, a hi-fi/entertainment center, a television, a digital video recorder, or a cable or satellite set stop box.

43. The computer readable medium of claim 23, wherein the method is executed in its entirety at a single computing device.

44. The computer readable medium of claim 23, wherein execution of two or more steps of the method is distributed among a plurality of processors.

45. Apparatus for decoding a spoken request for information, the apparatus comprising:
means for receiving said spoken request from a user;
means for applying an initial language model to said spoken request to identify one or more words contained in said spoken request; and
means for generating a second language model that includes words in said spoken request that are not recognized by said application of said initial language model.

46. The apparatus of claim 45, wherein said generating means is configured for generating said second language model by updating said initial language model.

47. The apparatus of claim 45, further comprising:
means for downloading one or more data items corresponding to said spoken request to a remote location.

48. The apparatus of claim 45, wherein said means for receiving, means for applying and means for generating are physically disposed in a single device.

49. The apparatus of claim 45, wherein two or more of said means for receiving, means for applying and means generating are separate processors that communicate over a network.

* * * * *